May 22, 1928.

J. V. ROBINSON 1,670,987

AUTOMATIC TRAIN PIPE CONNECTER

Original Filed March 5, 1920

Inventor
Joseph V. Robinson,
By his Attorneys
Foster, Freeman, Watson & Coit

Patented May 22, 1928.

1,670,987

UNITED STATES PATENT OFFICE.

JOSEPH V. ROBINSON, OF NEW YORK, N. Y.

AUTOMATIC TRAIN-PIPE CONNECTER.

Application filed March 5, 1920, Serial No. 363,431. Renewed October 22, 1927.

My invention relates to automatic train pipe connecters, and has for its object to provide an improved coupling head for such connecters, which will be simple in construction, efficient in operation, and economical of manufacture. My improvement is in that type of train pipe coupling heads known as the pin and funnel, in which a pin or conical shaped member enters a complementary opening in an opposing coupling head to align the heads in effecting a coupling under conditions where one of the connecters is higher than the other.

Figure 1:
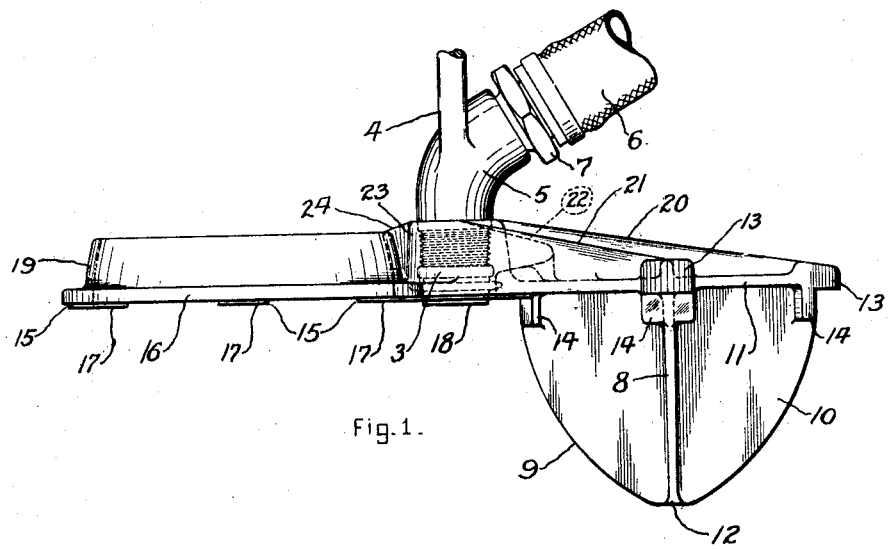
Figure 2:
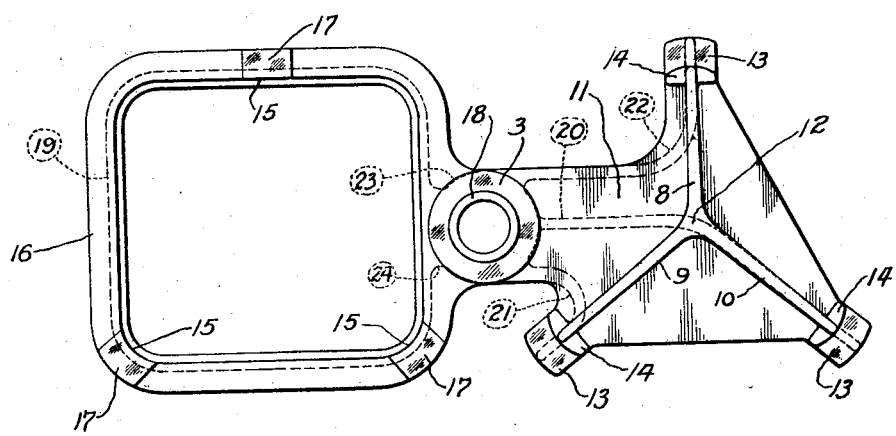

My improvement consists of the combinations, arrangements and constructions hereinafter described, pointed out in the appended claims, and illustrated in the accompanying drawings in which Figure 1 is a plan view of my improved coupling head and Figure 2 is a front elevation of my improved coupling head.

Referring to the drawings: My improved coupling head comprises a centrally disposed port or conduit 3 threaded at its rear side to receive any suitable form of support for flexibly supporting my improvement—see especially Figure 1. A preferable form of such support embodies a hollow member or conduit 5, which diverges laterally of the coupling head and is connected with the latter as shown, the usual train pipe hose 6 of the car being in turn suitably connected to the conduit 5. At one side of the port 3 of my improved coupling head, I provide a plurality of webs, 8, 9 and 10, which extend forwardly from the base or coupling face 11 of my improvement. These webs are preferably integrally formed with the base 11, though they may be otherwise connected thereto if desired. They are angularly disposed one to the other and form what may be broadly described as a cone shaped member, having an apex 12, towards which each of the webs converge from the base 11, or substantially therefrom. The angularity of the webs is preferably that shown, with the central one disposed in the vertical plane, though they may be otherwise angularly disposed, if desired. This construction of horn or cone shaped guiding member has the important advantage of producing a rugged and efficient guiding horn, the proper functioning of which will not be interfered with by the presence of foreign substance such as snow or ice, upon any one of the webs 8, 9 or 10, the angularity of the webs being such as to prevent permanent lodgment thereon of such substances. At the base of each of the webs, I provide a stop or bearing point 13, formed integrally with a seat 14, which seat is adaped to rest in a complementary seat 15 of the funnel member 16 of my improved coupling head. The stops or bearing point 13 are adapted to rest upon the complementary bearing points 17 of an opposing coupling head and serve to properly position the heads axially one with respect to the other. The opening in the funnel member 16 of my improvement is, of course, of sufficient dimensions and of such shape as to permit of the ready reception of the guiding horn or cone shaped member formed by the webs 8, 9 and 10, the webs 9 and 10 acting, in cooperation with the funnel member 16, to center the ports 3 of mating heads in the lateral direction, while all three of the webs cooperate with the funnel member to align the ports 3 of mating heads in the vertical direction. As stated, the cone shaped member, or horn, formed by the webs 8, 9 and 10, and the funnel or receiving member 16, may be secured to the base 11 or to the port 3 of my improved coupling head in any desired manner, but I preferably cast them integral therewith. It will be noted that the funnel member 16 is provided with a rearwardly extending flange or wall 19, the inner face of which conforms to the curve of the webs 8, 9 and 10. This flange or wall may be of any suitable depth, but for the purpose of preventing lodgment therein of foreign substances, I preferably construct it of a depth of less than 2 inches. Suitable reinforcing ribs 20, 21 and 22 extend from the nipple 23 of my improved coupling head to the base of the said webs, while a suitable reinforcing rib extends from such nipple to the flange 19, as shown at 24 in Figure 1.

Any suitable form of gasket 18 may be mounted within the port 3 of my improvement. I preferably so mount it that it will project slightly in advance of the bearing points 17 on the funnel member 16, so that as opposing coupling heads meet in service the gaskets thereof will be put under a slight initial compression.

What I claim as new is:

1. In a train pipe coupling head, a base, a guiding member projecting forwardly from said base, said member including a plurality of substantial flat webs angularly arranged with reference to each other the outer edges of which converge to a common point in front of said base and the inner edges of which merge together and are integrally connected, and a receiving member secured to said base and having an opening for receiving the guiding member of a mating head, the walls of said opening being shaped and arranged to fit over the guiding member of the mating head and closely engaging the webs thereof adjacent said base, whereby relative movement between two mating heads is prevented.

2. An automatic train pipe coupling head, comprising in combination a conduit and a base, a plurality of guiding webs extending forwardly from said base and converging inwardly towards a common center, a seat on each of said webs, a receiving member portions of which conform in outline to the outline of said webs, and bearings on said receiving member for mating with said seats of an opposing coupling head.

3. An automatic train pipe coupling head, comprising in combination a conduit and a base, a plurality of guiding members carried by said base and extending forwardly thereof and converging inwardly towards a common center and forming in front view the general outline of an inverted Y, and a receiving member on that side of said conduit opposite the side on which said guiding members are located, said receiving member being adapted to cooperate with the guiding members of an opposing coupling head to align said conduit with the conduit of said opposing head in coupling.

4. An automatic train pipe coupling head, comprising a base, a plurality of forwardly extending guiding members secured to the base and which converge inwardly to a common center and there unite, said guiding members being angularly disposed each to the other with, one of the members being disposed in substantially the vertical plane and each of the others sloping downwardly from their common center, and a receiving member having an inner face which conforms to the spread of said guiding members and which cooperates therewith to align opposing coupling heads in service.

5. An automatic train pipe coupling head, having a base, a funnel member on the said base, said funnel member comprising a plurality of substantially flat webs extending forwardly of the base and intersecting at a common point, the outer ends of said webs converging inwardly, one of said webs being arranged in a substantially vertical position and the others being inclined downwardly from their common point of intersection.

6. In a train pipe coupling head, a base, a guiding member projecting forwardly of said base, said member comprising a plurality of substantially flat guiding webs the outer edges of which converge toward a common center at their forward ends, each of said webs being arranged at an angle to the horizontal whereby lodgment of foreign substances thereon is prevented.

7. In a train pipe coupling head, a base, a guiding member projecting forwardly from said base, said member including a plurality of substantially flat webs, the outer edges of which are curved and converge to a common point in front of said base and the inner edges of which merge together and are integrally connected, and a receiving member secured to said base and having an opening for receiving the guiding member of a mating head, the walls of said opening being curved and spaced apart to fit over the guiding member of the mating head and closely engaging the curved outer edges of the webs thereof adjacent their inner ends, whereby relative movement to mating heads is prevented.

In testimony whereof I hereby affix my signature.

JOSEPH V. ROBINSON.